United States Patent [19]
Barrett

[11] 4,086,771
[45] May 2, 1978

[54] COMBINED INTERNAL COMBUSTION AND HEAT ENGINE

[76] Inventor: George M. Barrett, R.R. #5, Galt, Ontario, Canada, N1R 5S6

[21] Appl. No.: 718,817

[22] Filed: Aug. 30, 1976

[51] Int. Cl.² .............................................. F02G 3/00
[52] U.S. Cl. ....................................... 60/616; 60/620
[58] Field of Search ................ 60/597, 616, 617, 618, 60/620, 621

[56] References Cited

U.S. PATENT DOCUMENTS

| 1,301,614 | 4/1919 | Snyder | 60/616 |
|---|---|---|---|
| 1,887,633 | 11/1932 | Geiger | 60/616 |
| 2,196,979 | 4/1940 | Campbell | 60/618 |
| 3,228,189 | 1/1966 | Baker | 60/618 |

FOREIGN PATENT DOCUMENTS

| 355,403 | 10/1905 | France | 60/616 |
|---|---|---|---|
| 492,742 | 7/1919 | France | 60/616 |
| 539,274 | 6/1922 | France | 60/616 |
| 189,373 | 11/1922 | United Kingdom | 60/618 |

*Primary Examiner*—Carlton R. Croyle
*Assistant Examiner*—L. F. Casaregola
*Attorney, Agent, or Firm*—Diller, Brown, Ramik & Wight

[57] ABSTRACT

This disclosure relates to an adaptation of a conventional internal combustion engine wherein the customary energy losses in the form of heat are greatly reduced by the conversion of the heat into a power source for other cylinders of the engine. The engine includes plural cylinders of which certain cylinders are conventional internal combustion cylinders and there being a heated gas cylinder and a gas pumping cylinder whereby a gas may be heated by means of the heat loss generally occuring with respect to the internal combustion cylinder and this heated gas may be utilized to produce work in the heated gas cylinder, after which the gas is pumped back into the system by the pumping cylinder. The gas is preferably a combustible gas whereby gas which escapes past the pistons of the heated gas cylinder and the pumping cylinder into the customary crank case of the engine may be delivered into the internal combustion cylinder for burning therein.

8 Claims, 2 Drawing Figures

COMBINED INTERNAL COMBUSTION AND HEAT ENGINE

This invention relates in general to new and useful improvements in internal combustion engines, and more particularly to an internal combustion engine which has associated therewith heat engine components utilizing the normally wasted heat of the internal combustion engine.

It is well known that the efficiency of internal combustion engines is extremely low. Only under optimum conditions with the most efficient of internal combustion engines can an efficiency on the order of 30% be realized. A majority of the wasted energy is in the form of heat for which an elaborate cooling system must be provided. Except for a minor utilization of the heat energy to preheat the fuel and the utilization of the heat to heat an associated vehicle compartment in the case of automotive vehicles, the heat energy is entirely lost. In accordance with this invention, it is proposed to eliminate the usual cooling system associated with an internal combustion engine and to substitute for the cooling medium utilized in conjunction therewith a gas cooling medium which can readily absorb the heat and which gas, when heated, expands and is usable in conjunction with one or more cylinders of the internal combustion engine to function as a heat engine. The simplest manner of utilizing the heat energy is to eliminate the customary liquid circulation system utilized in conjunction with internal combustion engines and to make the so-called water jacket of the engine block gas tight and to circulate through the block, as well as the customary head, the selected gas. This gas may also be further heated by circulation through an exhaust manifold so as to provide for a maximum salvaging of the normally lost heat energy.

After the heated gas is utilized as the energy source in one or more cylinders of the engine, the heated and for the most part spent gas is then directed to a condenser wherein the gas is further cooled and restored to its initial state, after which the gas is directed into the pumping cylinder where a further small amount of energy is extracted therefrom. The pumping cylinder then pumps the gas back into the water jacket area of the block for recirculation.

It will be readily apparent that the customary preheating of the fuel for the internal combustion cylinders may still be accomplished and that the condenser may be utilized as an efficient heater for the heating of a vehicle compartment if it is so desired.

With the above and other objects in view that will hereinafter appear, the nature of the invention will be more clearly understood by reference to the following detailed description, the appended claimed subject matter, and the several views illustrated in the accompanying drawings.

IN THE DRAWINGS

Figure 1:
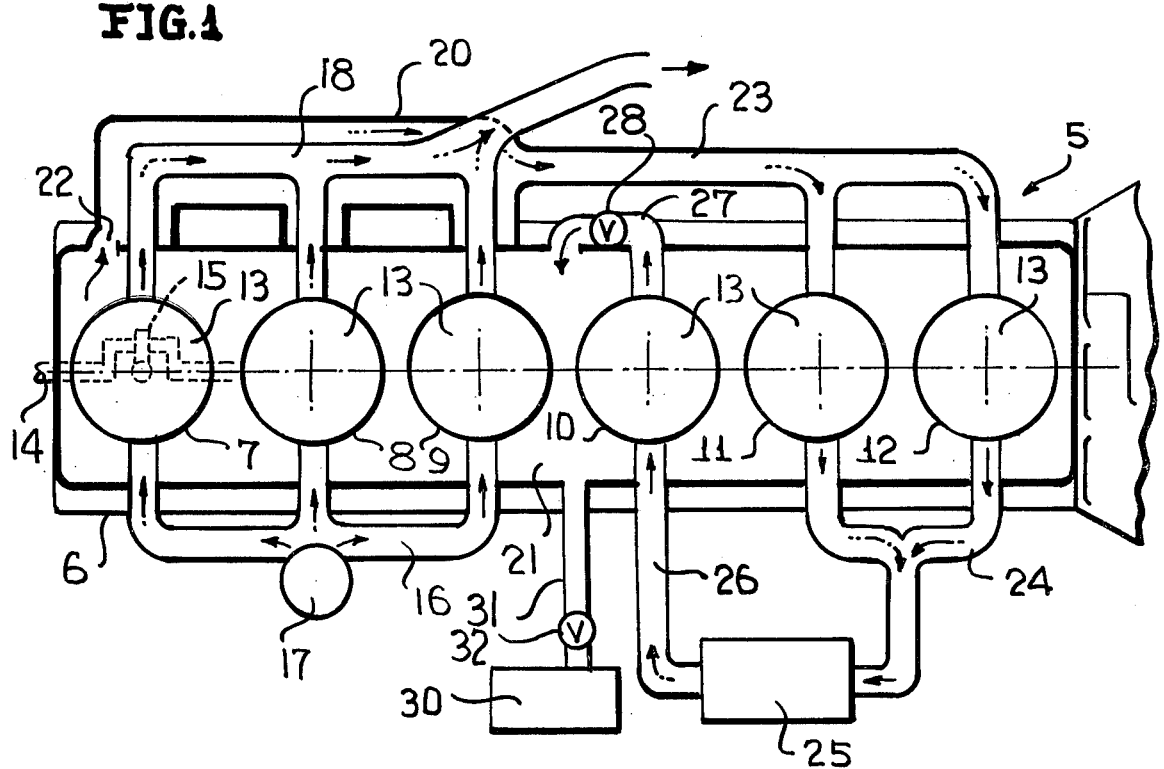
FIG. 1 is a schematic view of a conventional six cylinder internal combustion engine converted into a combined internal combustion and heat engine in accordance with this invention.

Referring now to the drawings in detail, it will be seen that there is illustrated in FIG. 1 a combined internal combustion and heat engine formed in accordance with this invention, the engine being generally identified by the numeral 5. The engine 5, if one so desires, may utilize existing components of engines presently utilized in automobiles. The engine 5 is a six cylinder engine and includes a customary engine block 6 having formed therein six cylinders, 7, 8, 9, 10, 11 and 12. Each of these six cylinders 7-12 has positioned therein a customary piston 13 for reciprocation. The engine 5 also includes the customary crankshaft 14 to which all of the pistons 13 are coupled by means of connecting rods 15 for reciprocation in sequence.

In accordance with this invention, cylinders 7, 8 and 9 will be internal combustion cylinders, cylinders 11 and 12 will be heated gas cylinders, and cylinder 10 will be a pumping cylinder. Cylinders 7, 8 and 9 will function as a three cylinder, four cycle internal combustion engine. Cylinders 11 and 12 will function as a two cylinder, two cycle heat engine. Cylinder 10 will function primarily as a pump although, as described hereinafter, certain energy may be obtained from cylinder 10. Preferably cylinders 10, 11 and 12 will have high compression ratios as compared to those of a normal internal combustion engine.

It is to be understood here that certain modifications will be required in the valving of the engine 5 as compared to a conventional internal combustion engine, particularly with respect to the cam shaft. This change in valving will be within the skill of an engine designer and many mechanics and, therefore, will not be described in detail here. Of course, the change in valving will also require minor variations in the construction of the head of the internal combustion engine 5.

Considering first cylinders 7, 8 and 9, it is to be understood that these cylinders will function in the normal manner of an internal combustion engine and a fuel-air mixture will be supplied to these cylinders in the customary manner. For purposes of illustration, the engine 5 includes a conventional intake manifold 16 having associated therewith a carburetor 17. It is to be understood that the engine 5 will be provided with the customary intake valves for distributing the fuel-air mixture into the cylinders 7, 8 and 9 in the proper timed relation to the reciprocation of the pistons 13 thereof.

The engine 5 also includes an exhaust manifold 18 for receiving exhaust gases from the cylinders 7, 8 and 9. The exhaust manifold 18 is incorporated in a heat exchange jacket 20 for heat exchange purposes to be described hereinafter.

It is to be understood that cylinders 7, 8 and 9 form a three cylinder engine which is capable of operation independently of the remainder of the engine 5.

The space within the block 6 surrounding the various cylinders thereof is normally filled with a coolant and is normally identified as a water jacket. The same terminology will be utilized here and the water jacket will be identified by the numeral 21. All of the normal coolant flow openings in the block 6 and the associated head will be closed in a manner so as to be gas tight. However, a suitable opening 22 will be formed in the block 6 so as to communicate the water jacket 21 with the interior of the heat exchange jacket 20 surrounding the exhaust manifold 18.

Suitable flow conduits 21 lead from the heat exchange jacket 20 to the cylinders 11, 12 for supplying heated gases thereto. The gases will be directed into the cylinders 11, 12 in timed relation to the reciprocation of the pistons 13 thereof by means of customary valving although the pistons of the cylinders 11, 12 will have a power stroke every two cycles whereas the pistons of the cylinders 7, 8 and 9 will have a power stroke only every four cycles.

Controlled exhaust of the spent heated gases from the cylinders 11, 12 will be by way of conventional exhaust valves into an exhaust conduit 34. Gases are directed by the exhaust conduit 24 into suitable gas cooler 25 which may also be part of the heating system of a vehicle if the engine 5 is utilized as a power plant in a vehicle. It is to be understood that the gas cooler 25 serves to make the gases more dense without changing the phase from gas to liquid.

A further conduit 26 leads from the condenser 25 into the cylinder 10 through suitable valving. While the cylinder 10 is primarily a pumping cylinder, the gases flowing thereto will be under a slight pressure and will perform work as the gases flow into the cylinder 10 against the piston 13. The cylinder 10 is also preferably provided with valving of the two cycle type. Exhaust from the cylinder 10, controlled by conventional valving is into a conduit 27 which leads back into the jacket 21.

At this time it is pointed out that although a single engine block is illustrated, the two engine components could possibly be separately formed. However, with respect to the illustrated six cylinder engine 5, it has been found that conventional engine components may be utilized with minor changes, for example, the pistons for the cylinders 10, 11 and 12 may be of higher compression ratio than normal, and certain changes in the valving of the head are desirable, together with a modified cam shaft construction.

It will be readily apparent that a six cylinder engine formed in accordance with this invention has only three cylinders thereof which require fuel and of the other three cylinders, two cylinders, cylinders 11 and 12, are pure working cylinders, while cylinder 10 is primarily a pumping cylinder although a small amount of work occurs during the downward stroke of the piston 13 thereof. Accordingly, it might be said that the cylinder 10 is a non-productive cylinder in that the working efforts on the downstroke of the piston thereof is substantially equal to no more than the work required during the upward pumping stroke of that piston.

On the other hand, it is to be understood that all work obtained from the cylinders 11 and 12 is a bonus. Further, the engine construction, without the usual cooling system, eliminates the energy required by the water pump and quite possibly the usual fan although depending upon the engine construction and use, it may be necessary to utilize a fan in conjunction with the gas cooler 25. Accordingly, with these benefits, the six cylinder engine 5 may have the same power output as the same engine, i.e., bore and stroke, wherein fuel is supplied to all six cylinders thereof. In other words, the engine 5 is expected to have similar power output with only half the fuel requirement.

At this time it is pointed out that it is expected that there will be a loss of the gas from the system past the rings of the pistons 13 in the cylinders 10, 11 and 12. Accordingly, the engine 5 also includes a gas supply reservoir 30 which is coupled with the gas system of the engine, preferably with the jacket 11, by means of a conduit 31. The conduit 31 has incorporated therein a constant pressure valve 32 which permits supplying of gas from the reservoir 30 to the jacket 21 only when the pressure within the jacket 21 drops below a predetermined pressure.

It is pointed out here that the gas be utilized, in addition to having the desired heat absorbing and expansion characteristics preferably should be one which is consumable by burning. Many internal combustion engines, particularly those manufactured for use in the United States, are provided with environmental control devices wherein crank case gases are recirculated through the carburetor for burning. Thus the gases which escape past the pistons of the cylinders 10, 11 and 12 in many instances will be recirculated through the carburetor 17 to be burned. It has been found that many hydrocarbons are suitable for such gases.

Figure 2:
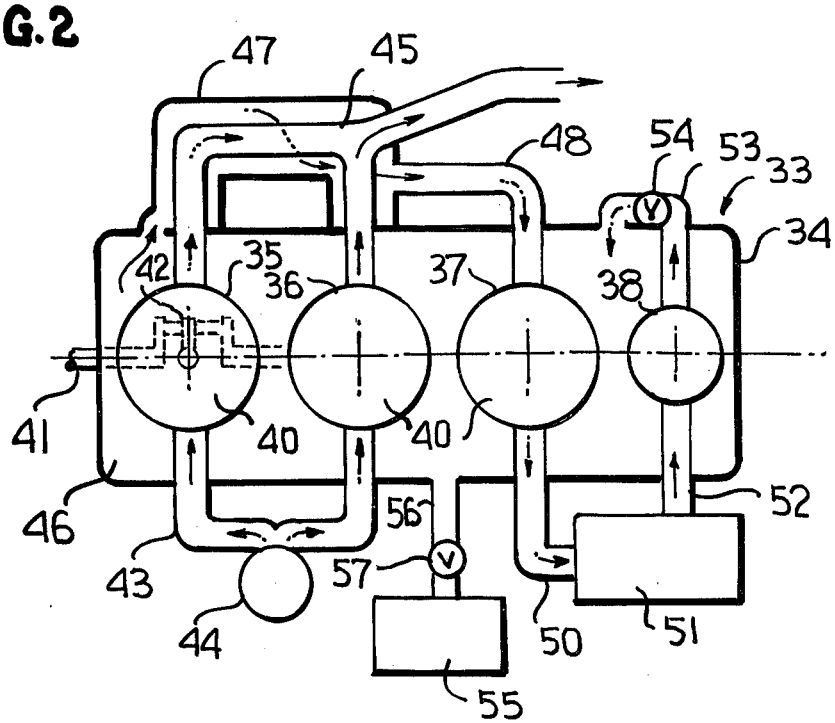
FIG. 2 is another schematic view showing a four cylinder embodiment of the invention.

It is also pointed out here that the invention is not restricted to an engine having any particular number of cylinders. Accordingly, reference is made to FIG. 2 wherein there is illustrated in a four cylinder embodiment of an engine formed in accordance with this invention. The engine of FIG. 2 is generally identified by the numeral 33 and is basically identical with the engine 5 except that the block 34 thereto in lieu of having six cylinders has only four which includes cylinders 35, 36, 37 and 38. Each of these four cylinders is provided with a piston 40 and the pistons 40 are interconnected by means of a crankshaft 41 utilizing connecting rods 42.

The cylinders 35, 36 are internal combustion cylinders and have associated therewith an intake manifold 43 and a carburetor 44 as the means for providing a fuel-air mixture. Associated with the cylinders 35, 36 is an exhaust manifold 45.

The cylinder 37 is a heated gas cylinder while the cylinder 38 is a pumping cylinder.

Like the engine 5, the engine 33 is provided with a gas system which includes utilizing the conventional water jacket 46 as a heat exchange jacket and filling the same with gas while all of the usual water pump outlets, etc. are sealed against escape of gas under pressure. The exhaust manifold 45 is also provided with a heater jacket 47 into which gases from the jacket 46 enter and are further heated by the hot exhaust gases of the manifold 45. Gases from the jacket 47 enter into the cylinder 37 through a conduit 48 and pass from the cylinder 37 to the cylinder 40 through a conduit 50, a gas cooler 51 and a conduit 52. Gases from the cylinder 38 pass back into the jacket 46 through a conduit 53 which preferably has a pressure control valve 54 incorporated therein.

The engine 33 is also provided with a gas supply reservoir 55 which is connected to the jacket 46 through a conduit 56 having a constant pressure valve 57 therein.

It is to be understood that the operation of the four cylinder engine 33 will be the same as that of the six cylinder engine 5 with the cylinders 35 and 36 forming the combustion engine part of the engine 33 and the cylinder 37 forming the heated gas engine part thereof.

It is pointed out here that the cylinder 38 is made smaller than the cylinders 35, 36 and 37 and that the capacity of the pumping cylinder should be approximately one-half the capacity of the heated gas cylinder. In the engine 5, because there are two heated gas cylinders 11, 12 the pumping cylinder 10 could be of the same size as the other cylinders. However, because there is only one heated gas cylinder 37 in the engine 33, it is necessary that the cylinder 38 be of a reduced diameter. If it is desired to utilize a conventional four cylinder block, the cylinder 38 can be made by inserting a suitable sleeve in the usual cylinder.

Although only two embodiments of the invention have been specifically illustrated and described herein, it is to be understood that the same principals may be applied to engines of other cylinder arrangements. Of course, there must be at least one internal combustion cylinder, one heated gas cylinder and one pumping cylinder.

While preferred forms and arrangements of parts have been shown in illustrating the invention, it is to be clearly understood that various changes in detail and arrangement of parts may be made without departing from the spirit and scope of this disclosure.

What is claimed is:

1. A combined internal combustion and heat engine comprising engine components including cylinder block means defining a plurality of cylinders and a heat exchange jacket surrounding said cylinders, said cylinders including at least one internal combustion cylinder, at least one heated gas cylinder and at least one gas pumping cylinder, an energy supply system for delivering a combustible mixture to said internal combustion cylinder, exhaust means for receiving hot exhaust gases from said internal combustion cylinder, first conduit means for directing heated gases from said heat exchanger jacket to said heated gas cylinder, second conduit means for directing gases from said heated gas cylinder to said pumping cylinder, and third conduit means for directing gases under pressure from said pumping cylinder back into said heat exchange jacket for reheating and recirculation, each of said cylinders including a piston, and coupling means connected to said pistons for simultaneous reciprocation of all of said pistons in constant timed phased relation, and said second conduit means including a gas cooler for making more dense expanded gases passing from said heated gas cylinder prior to passage thereof into said pumping cylinder.

2. The engine of claim 1 wherein said coupling means includes a crankshaft rotatably journalled in said cylinder block.

3. The engine of claim 1 wherein cooled and dense gases enter said pumping cylinder at a positive pressure.

4. The engine of claim 1 wherein said engine components include exhaust manifold means, and said first conduit means includes heat transfer means cooperatively associated with said exhaust manifold means for extracting heat from hot exhaust gases from said combustion cylinder.

5. The engine of claim 1 wherein said heat exchange jacket and said conduit means are filled with a gas capable of being consumed in said combustion cylinders.

6. The engine of claim 5 wherein said consumable gas is a hydrocarbon.

7. The engine of claim 1 wherein there are plural internal combustion cylinders and plural heated gas cylinders, the number of heated gas cylinders is greater than that of said pumping cylinder, and the number of internal combustion cylinders is greater than that of said heated gas cylinders.

8. The engine of claim 1 wherein there are plural internal combustion cylinders, and single heated gas cylinder and single pumping cylinder, and said pumping cylinder is of a lesser size than said heated gas cylinder.

* * * * *